United States Patent [19]

Kaldas et al.

[11] Patent Number: 5,395,559
[45] Date of Patent: Mar. 7, 1995

[54] GRANULATED AMMONIUM NITRATE PRODUCTS

[75] Inventors: Aida Kaldas, Brossard, Canada; Raymond Oliver, Norton, England

[73] Assignees: Imperial Chemical Industries, PLC, London, United Kingdom; ICI Canada Inc., North York, Canada

[21] Appl. No.: 59,473

[22] Filed: May 5, 1993

[30] Foreign Application Priority Data

May 5, 1992 [GB] United Kingdom ............... 9209619

[51] Int. Cl.⁶ .................................. C06B 21/00
[52] U.S. Cl. ........................ 264/3.4; 149/46; 23/303
[58] Field of Search ............ 149/109.6, 46; 264/3.4; 23/301, 303

[56] References Cited

U.S. PATENT DOCUMENTS

| | | | |
|---|---|---|---|
| 4,124,663 | 11/1978 | Brumley et al. | 264/3 |
| 4,501,773 | 2/1985 | Nioh et al. | 427/213 |
| 4,701,353 | 10/1987 | Musters et al. | 427/213 |
| 4,913,725 | 4/1990 | Nishikawa et al. | 71/92 |
| 5,154,752 | 10/1992 | Scheibler et al. | 71/60 |

Primary Examiner—Donald P. Walsh
Assistant Examiner—Anthony R. Chi
Attorney, Agent, or Firm—Charles Q. Buckwalter, Jr.

[57] ABSTRACT

A process for the production of explosives grade ammonium nitrate prill (EGAN) comprises the steps of (A). producing seed ammonium nitrate prill as substantially monosized prills; and then (B). fattening using melt/solution of ammonium or mixed nitrates, with drying and thermal treatments, the seed prill in an inclined rotating jacketed pan granulator or a cascade of such pans to produce a final fattened EGAN prill product preferably having at most about 4 mm diameter.

7 Claims, 1 Drawing Sheet

GRANULATED AMMONIUM NITRATE PRODUCTS

BACKGROUND OF THE INVENTION

This invention concerns ammonium nitrate prill as used in explosive formulations such as ANFO (which is ammonium nitrate (AN) prill containing absorbed fuel oil (OF) at a level of about 6% by weight or higher) and HANFO, or "Heavy ANFO", which is a blend of AN prill (or ANFO) and emulsion explosive.

Explosives grade ammonium nitrate prill (herein "EGAN" prill) is required to be sufficiently porous to be able to absorb the quantity of fuel oil needed for an effective explosives composition. Porosity, which is indicated comparatively by particle density and bulk density, is affected by the conditions of prill formation (especially the initial water content of the spray melt) and the conditions under which the residual small percentage of water (up to 5% by weight) in the collected product at the base of the prill tower is removed by a drying process (down to e.g. 0.1 to 0.2% by weight). The size of EGAN prill is usually around 2 to 3 mm diameter, but larger diameters are not excluded.

In the specification of co-pending UK Patent Application No. 91 24 304.8 a process is described for producing predominantly monosized prills of AN in a prilling tower by a modification of the process described in published EP 0 320 153. The disclosure in UK 91 24 304.8 is as follows:

"It is known from EP-A-0 320 153 that the disintegration of a liquid jet comprising a highly concentrated solution of ammonium nitrate can be controlled so as to produce a substantially monosize distribution of droplets and hence, on solidification, particles. The disintegration is controlled by causing the plate, wherein an orifice which produces the liquid jet is located, to vibrate at a predetermined frequency and in a plane substantially perpendicular to the direction of flow of the liquid jet, thereby inducing a so-called asymmetric disturbance on the surface of the liquid jet. The vibration is required to have an amplitude which is substantially smaller than that used in other systems wherein the orifice containing plate is vibrated in a plane parallel to the direction of flow of the liquid jet and/or wherein the orifice containing plate is swung from side to side. The predetermined frequency is required to be calculated according to the expression $$f_{OPT} = u_j(4.5d_j)^{-1} \quad (1)$$

wherein $f_{OPT}$ is the frequency in Hertz, $u_j$ is the velocity of the jet from the orifice (m.s$^{-1}$) and $d_j$ is the diameter of the orifice (m). The effect of applying a vibration having the predetermined frequency was confirmed using water, which flow properties are similar to those of a highly concentrated solution of ammonium nitrate, and was successfully applied to the prilling of fertilizer grade ammonium nitrate. It is known in the art that fertilizer grade ammonium nitrate is required to have a high bulk density, and to be relatively non-porous. In order to achieve these desired properties the fertilizer grade ammonium nitrate is produced from a highly concentrated ammonium nitrate solution having an ammonium nitrate concentration of at least 99% by weight, which is known in the art as ammonium nitrate melt or molten ammonium nitrate. Prilling of ammonium nitrate solutions having ammonium nitrate concentrations of less than 99% by weight, e.g. 96% by weight produce a lower density, porous, and physically weaker material which is not as suitable for use as a fertilizer.

It is also known to use ammonium nitrate as an explosive, however, the required characteristics of explosive grade ammonium nitrate are different from those of fertilizer grade ammonium nitrate in that explosive grade ammonium nitrate is required to be relatively porous so that it is able to more readily absorb the various additives and conditioners used to sensitize it to detonation. Thus, in the preparation of explosive grade ammonium nitrate it is required that a solution having a low concentration of ammonium nitrate, i.e. less than 99% w/w, is prilled and the resulting droplets solidified in a generally similar process to that used for the preparation of fertilizer grade ammonium nitrate. In the preparation of explosive grade ammonium nitrate it is also desirable to obtain a monosize distribution of particles. Application of asymmetric vibrations to the orifice containing plate at a predetermined frequency calculation according to the method disclosed in EP-A-0 320 153, however, does not lead to the preparation of explosive grade ammonium nitrate comprising particles having a monosize distribution.

SUMMARY OF THE INVENTION

It has now been found that prilling of solutions containing low concentrations of ammonium nitrate can be controlled to give monosize distributions of droplets and hence particles by applying vibrations to the orifice containing plate which are of a frequency determined according to an expression which is different from expression (1).

Accordingly the present invention provides a prilling process wherein a liquid comprising between 90 to 98% w/w ammonium nitrate is caused to flow through an orifice in a plate thereby forming a liquid jet and that as the liquid flows through the orifice the plate is vibrated in a plane substantially perpendicular to the direction of the liquid jet thereby producing a asymmetric disturbance to the surface of the liquid jet and the frequency of the vibration at/or within 10% of the optimum frequency as given by the expression:

$$f_{OPT} = u_j(\pi \cdot 2^{0.5} \cdot d_j(1+3z))^{-1} \quad (2)$$

wherein $f_{OPT}$ is the frequency in Hertz, $u_j$ is the velocity of the jet from the orifice (m.s$^{-1}$), $d_j$ is the diameter of the orifice (m), z is the dimensionless group $(We_j)^{0.5} \cdot (Re_j)^{-1}$, $We_j$ is $d_j u^2 p.y^{-1}$, $Re_j$ is $d_j u.p.g^{-1}$, p is the density of the liquid (kg.m$^{-3}$), y is the surface tension of the liquid (N.m$^{-1}$) and g is the viscosity of the liquid (Ns.m$^{-2}$).

One of the differences between the prilling of fertilizer grade ammonium nitrate and explosive grade ammonium nitrate is that the physical properties, in particular the viscosity of the ammonium nitrate solution, influences the hydrodynamics of the droplet formation process thereby preventing the direct use of the expression (1) to determine the optimum frequency of vibration of the orifice containing plate. The viscosity of ammonium nitrate solution is significantly higher than both that of ammonium nitrate melt and also water. Thus, the ammonium nitrate solution is no longer an inviscid liquid, as assumed in derivation of expression (1), but is a viscid liquid the flow properties of which are better described by expression (2). The transition between inviscid and viscid flow is not abrupt. However, where the viscosity of the liquid is less than 1.5 cP (0.0015 Ns.m$^{-2}$) then expression (1) is usually more appropriate, whereas at higher viscosities expression (2) is more appropriate.

The plate used in the prilling process is generally circular in plan view and may also be dished such that the liquid jet issues from the convex side of the plate. Generally each plate contains a plurality of orifices, for example from 2000 to 3000 per plate. Although the vibration of the plate may be through a reciprocating translational movement it is particularly convenient to vibrate the plate through a reciprocating rotational movement wherein the axis of rotation is through the plate, e.g. through the centre of the plate, in a direction generally coincident with the direction of the liquid jet or jets produced.

Where the vibration is through a reciprocating rotational movement it is preferred that the vibration has an amplitude equivalent to $10^{-5}$ to $10^{-3}$ radians of rotation.

The liquid from which explosive grade ammonium nitrate is usually produced comprises a solution containing from 90 to 98% w/w ammonium nitrate, more usually from 92 to 95% w/w ammonium nitrate.

The liquid jet formed by the orifice has a velocity which depends upon the size of the orifice and upon the mass flow rate. The orifice is usually in the form of a circular hole having a diameter from 0.5 to 2 mm, e.g. 0.75, 1.1 or 1.13 mm. In keeping with the teaching of EP-A-0 320 153 it is also preferred that the flow through the orifice is laminar and uniform flow of the liquid jet is achieved. Similarly, it is preferred that the Reynolds Number does not exceed 2300, and more particularly is in the range from 500 to 2000."

The disclosure of EP Specification No. 0 320 153 is incorporated herein by reference.

The explosive performance of explosive compositions based on EGAN prills or incorporating such prills in an energetic matrix is a function of many variables, but important amongst these are the composition, structure and size of the EGAN prills. Increasingly the explosives art is recognising the differences in performance (such as sensitivity to initiation, strength, water-resistance, oil absorbance, V.O.D.) that arise from use of different origin EGAN prills. Attention is now being directed to "engineering" desired properties for selected applications so that a range of differentiated EGAN products may be available to the customer.

An obstacle to achieving this objective is the lack of control at the particle-forming level inherent in prior-published and prior-practised processes for making EGAN products. Despite the same ingredients going in to the melt/solution from which the solid EGAN products are made, the resultant constituent particles vary in size, moisture content, porosity and other more subtle structural features. This defeats intra-product uniformity and is antagonistic to inter-product differentiation.

We have now devised a process (involving two distinct sub-processes for forming solid EGAN particles), which enables substantial uniformity of particle size, structure, composition to be achieved (i.e. all particles much the same) and gives improved opportunity to manufacture reproducibly differentiated products by change of formulation and/or process conditions/treatments.

DETAILED DESCRIPTION

Figure 1:
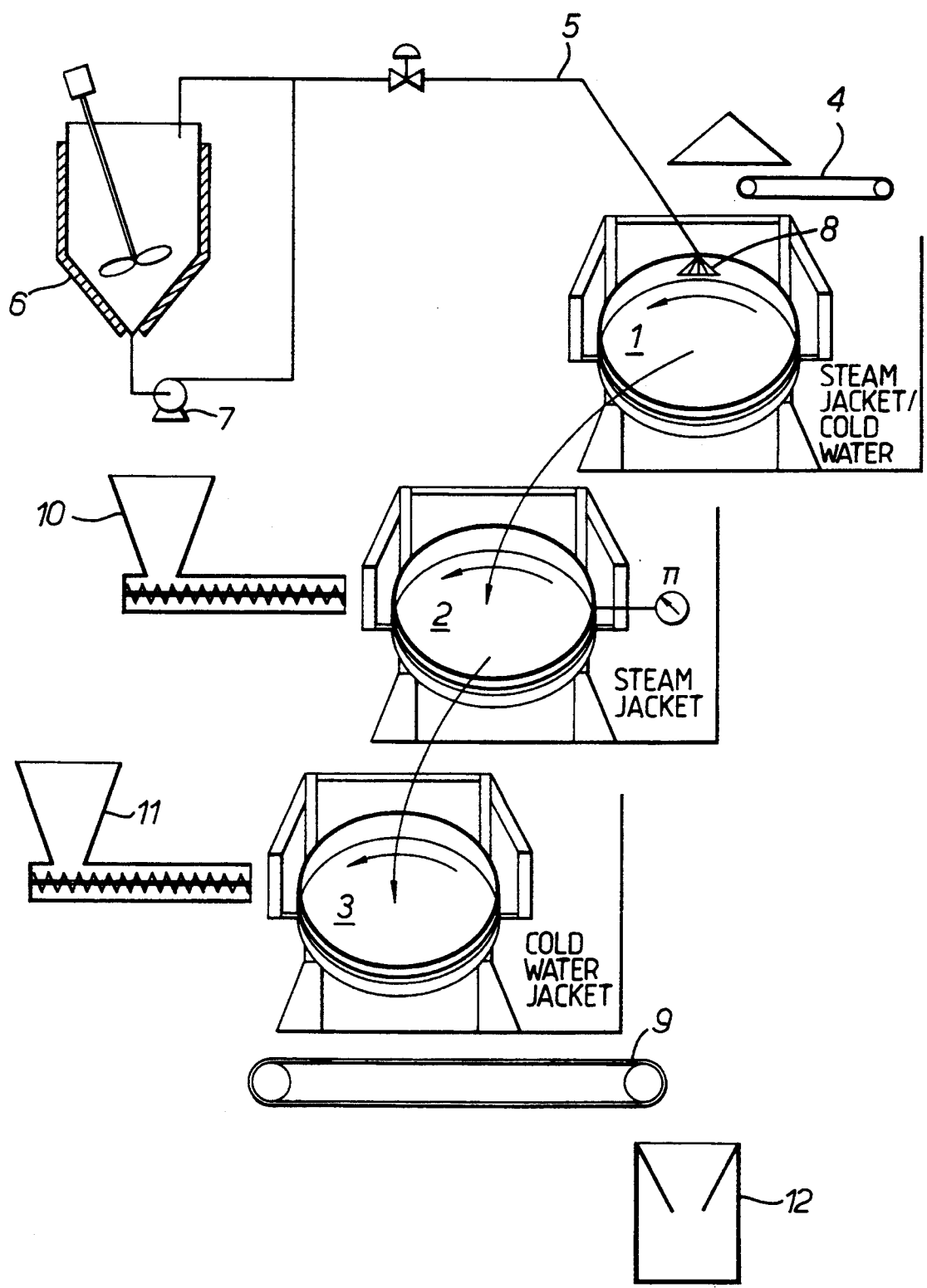
FIG. 1 shows schematically a typical cascade of rotary jacketed pans.

The process of the present invention comprises as constituent sub-processes:

(A). first producing seed AN prill (EGAN or FGAN, i.e. porous, oil-absorbent less dense explosive grade prill or dense, low absorbency fertilizer grade prill), as substantially monosized prills (especially by the processes described in the above-referenced specifications) and secondly (B). fattening, with drying and thermal treatment, the seed prill in an inclined rotating jacketed pan granulator or a cascade of such pans to produce a final fattened EGAN prill product.

Inclined rotating jacketed pan granulators are known devices. Fattening within the granulator is achieved by spraying melt or solution (with or without modifier agents) on to the rotating tumbling shallow bed of particles in the pan and effecting thermal treatment (heating or cooling) by heat conduction with the jacketed pan interior surface which contacts the moving bed of particles. A heat transfer fluid such as cold water, hot water, or superheated steam flows through the jacket.

In the case of ammonium nitrate particle fattening a melt/solution of AN with/in water containing from about 95 to 98% AN (preferably 95–96%) by weight would be used, the other component being essentially water although the use of mixed AN/MN systems, where MN is another nitrate of the sort acceptable as an oxidising co-ingredient in AN-based explosive precursors and formulations, is allowed. Additionally the melt/solution may contain (and desirably will contain) crystal habit modifiers, surface treating agents, anti-caking agents and/or other effect-imparting substances as will already be familiar to those skilled in EGAN production.

The seed prill from the first process will advantageously be directly fed from the base of the prill production facility (e.g. a prilling tower product side stream) to the pan granulation facility. Accordingly it maybe a so-called "wet" prill containing, say 0.3 to 4.0% by weight of water, a range embracing drier FGAN prill and wetter EGAN prill. It will advantageously consist of particles less than about 3 mm diameter, preferably less than about 2 mm diameter, and in the case of FGAN seed prill is more preferably between 1 and 1.5 mm in diameter to assure adequate oil-absorbency of the fattened EGAN prill made from it without needing to produce an unduly large final EGAN product (i.e. preferably at most about 4 mm diameter).

The seed prill may essentially consist of AN, apart from residual water, or it may contain an AN/MN mixture instead of solely AN where MN here is another nitrate as familiar from both the FGAN and EGAN arts.

However, it is not important for the seed prill to contain any of the usual additives which would be desired for a final FGAN or EGAN product because these can be incorporated at the fattening stage.

The feeding of essentially monosized uniform prills to the pan fattening facility enables the tendency of an inclined rotary pan to discharge (by overspill of particles) product in a given narrow size range to be fully realised to advantage for EGAN product manufacture.

The present process makes it unnecessary to further screen product before customer allocation and allows continuous operation without solids recycle. The control variables of the pan fattening stage viz: spray solution/melt composition, rate of spray feed relative to particle feed, degree of cooling and/or warming of the pan in which fattening takes place, and of course the dimensions and attitude of the pan which affect residence time, make possible a very wide range of particle structure and surface properties. Subsequent pan treatments (preferably in a cascade of pans of which the first is a fattening pan) may include conductive heating to dry and condition the fattened prills crystalline structure so as to effect changes in porosity, density, hardness and surface texture, followed by a further thermal treatment e.g. rapid cooling or a reduced temperature annealing to yield final EGAN product.

FIG. 1 shows schematically a typical cascade of rotary jacketed pans. Referring to FIG. 1, three jacketed inclined rotary pans 1, 2 and 3 are shown as a cascade. Pan 1 is a fattening pan receiving seed prill (not shown) from track 4 and sprayed melt/solution through line 5 from stirred tank 6 via pump 7 and discharge through spray-head 8. Pans 1, 2 and 3 are supplied with heat transfer fluid (e.g. steam or cold water) passing through their internal wall cavities as process needs dictate. Fattened prill forms in pan 1 by solidification/crystallisation of AN melt/solution, the extent of fattening being controlled by feed rates and residence times. Fattened prill discharges as particles of essentially still one size in to pan 2 where conductive heating by jacketed steam takes place. This is the principal thermal treatment stage, causing pore development and drying. Pan 3 is supplied with cold water through its cavity wall and heat-treated prill spilling from pan 2 is cooled in it before final discharge on to track 9 leading to bin 12. Optional solid additives feed systems (e.g. for supply of anti-caking agents) are shown at 10 and 11.

A representative set of possible operating conditions is as follows:

Seed Prill Feed—50 kg/hr
Spray solution—95 AN/5 Water, by weight, plus typical additives
Rate of spray—50 kg Sol$^n$/hr
Prill size IN—1.5 mm average
Prill size OUT—2 mm average
Temperature of Feed EGAN prill—80° C.
Temperature of spray—135°-140° C.
Pan diameters—60 cm
Pan depths—10 cm
Pan Residence times—30 mins
Pan 2 Operating Temperature—120° C.
Pan 3 Operating Temperature—20° C.

We claim:

1. A process for the production of explosives grade ammonium nitrate prill (EGAN), which process comprises
   (A) producing seed ammonium nitrate prill, (i.e. porous, oil-absorbent less dense explosive grade prill or dense, low absorbency fertilizer grade prill), as substantially monosized prills; and then
   (B) fattening, with drying and thermal treatments, the seed prill in an inclined rotating jacketed pan granulator or a cascade of such pans to produce a final fattened EGAN prill product preferably having at most about 4 mm diameter.

2. The process of claim 1 wherein fattening within the granulator is achieved by spraying a melt/solution of ammonium nitrate (AN) with/in water containing from about 95 to 98% AN (with or without modifier agents) on to the seed prill particles rotating and tumbling as a shallow bed in the granulator.

3. The process of claim 2 wherein fattening is achieved by spraying mixed AN/MN systems, where MN is another nitrate acceptable as an oxidising co-ingredient in AN-based explosive precursors and formulations.

4. The process of claim 2 wherein the said AN is a solution of AN (as the sole nitrate present) in water and contains 95–96% AN by weight.

5. The process of claim 1 wherein the seed prill used in the first process (A) is directly fed from the base of a prill production facility to the pan granulator(s).

6. The process of claim 1 wherein seed prill of about 1.5 mm size is fed to a pan granulator being the first in a cascade of pans, at a prill temperature of about 80° C., and the said prill is sprayed with around 95–96% (w/w) AN melt/solution at a temperature in the range of from 135° to 140° C., to cause particle fattening, and effecting thermal and drying treatments in downstream pans.

7. The process of claim 6 wherein the pan granulators each have a diameter of about 60 cm and a depth of about 10 cm.

* * * * *